| (12) United States Patent | (10) Patent No.: | US 8,461,766 B2 |
| Nerone | (45) Date of Patent: | Jun. 11, 2013 |

(54) DRIVER CIRCUIT WITH PRIMARY SIDE STATE ESTIMATOR FOR INFERRED OUTPUT CURRENT FEEDBACK SENSING

(75) Inventor: Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 12/963,752

(22) Filed: Dec. 9, 2010

(65) Prior Publication Data

US 2012/0146545 A1    Jun. 14, 2012

(51) Int. Cl.
*H05B 37/02* (2006.01)
(52) U.S. Cl.
USPC ............ 315/219; 315/276; 315/287; 315/308
(58) Field of Classification Search
USPC ............ 315/209 R, 219, 221, 246, 276, 283, 315/287, 291, 299, 307, 308
See application file for complete search history.

(56) References Cited

U.S. PATENT DOCUMENTS

| 7,307,390 B2* | 12/2007 | Huynh et al. ................. 315/291 |
| 7,635,956 B2* | 12/2009 | Huynh et al. ................. 315/291 |
| 7,688,009 B2* | 3/2010 | Bayadroun ................... 315/360 |
| 7,808,802 B2* | 10/2010 | Cai ............................. 363/21.12 |
| 8,305,004 B2* | 11/2012 | Shao ............................. 315/247 |
| 8,391,028 B2* | 3/2013 | Yeh ............................. 363/21.05 |
| 2004/0056644 A1 | 3/2004 | Wang |
| 2007/0121349 A1 | 5/2007 | Mednik et al. |
| 2008/0043496 A1 | 2/2008 | Yang |
| 2008/0094047 A1 | 4/2008 | Huynh et al. |
| 2008/0232142 A1 | 9/2008 | Yang |
| 2009/0067201 A1 | 3/2009 | Cai |
| 2010/0141178 A1 | 6/2010 | Negrete et al. |

FOREIGN PATENT DOCUMENTS

WO    2008004018 A2    10/2008

OTHER PUBLICATIONS

"Transition-mode PFC controller", L6562, product data sheet, from STmicroelectronics, Nov. 2005, 16 pages.

* cited by examiner

*Primary Examiner* — Thuy Vinh Tran
(74) *Attorney, Agent, or Firm* — Fay Sharpe LLP

(57) ABSTRACT

An LED driver circuit and an isolated DC-DC converter therefor are presented, in which a primary side state estimator circuit is provided for inferred output current sensing for closed loop control of pulse width modulated flyback or buck converters. Specifically, the estimator circuit includes a capacitance having a first terminal coupled to a comparator input of a pulse width modulation controller, and a second terminal coupled to an error input of an error amplifier, and a switching device having a first power terminal coupled to the second terminal of the capacitance, a second power terminal coupled to the circuit ground, and a control input terminal coupled to a drive output of the pulse width modulation controller.

19 Claims, 3 Drawing Sheets

DRIVER CIRCUIT WITH PRIMARY SIDE STATE ESTIMATOR FOR INFERRED OUTPUT CURRENT FEEDBACK SENSING

BACKGROUND OF THE DISCLOSURE

LED drivers and other lighting power circuits often employ flyback, buck-boost, and buck converters to provide DC power for driving a light source. To provide closed-loop control for such converters, a signal proportional to the output current is used as a control variable, typically via current sensing resistors in the output circuit. Direct output sensing cannot be done in converters in which the output is isolated from the input by a transformer, in which case the output current has been sensed using current transformers and/or optical isolation components. These components, however, occupy circuit board space and are costly. Moreover, direct sensing is undesirable in low power converters, with or without isolation, as any direct sensing of the output current significantly lowers the driver efficiency. While current transformers may minimize the impact on efficiency, these extra components are bulky and expensive in comparison to the cost of the converter itself, and impact the compactness of the converter. Accordingly, there is a need for improved output current sensing capabilities and systems for closed loop power converter control.

SUMMARY OF THE DISCLOSURE

The present disclosure provides techniques and circuitry for inferring the output current from a primary-side current mode control sense resistor rather than extracting it from an output sense resistor or a current transformer. The various aspects of the disclosure may be advantageously employed in power converters for driving light sources, such as flyback converters, buck converters, and buck-boost converters for driving LEDs or in such converter stages used to power other types of light sources. In disclosed embodiments, the current flowing through the PWM switch is sensed and is used to charge a capacitor of a state estimator using an analog switch controlled by the converter PWM drive signal. The estimator switch and capacitor sample the current from the sense resistor and feed it to an error amplifier for use in setting the trip point of the current mode control comparator. The disclosure thus facilitates output current estimation without the cost, space, and efficiency tradeoffs inherent in conventional pulse transformer type sensing approaches.

A circuit is provided for powering at least one light source, which includes a transformer, a main power switch, a pulse width modulation (PWM) circuit with a PWM controller and an error amplifier, and an estimator circuit that is electrically isolated from the transformer secondary. In certain embodiments, the pulse width modulation circuit and the estimator circuit are integrated into an application specific integrated circuit (ASIC).

The transformer has primary and secondary windings, with the secondary coupled to provide power to a light source, such as an LED or to a subsequent converter stage for powering AC-driven lamps. A sense resistor is connected between the transformer primary winding and a circuit ground, and a first switching device is coupled in series with the sense resistor and the transformer primary winding. The switch is operated by a pulse width modulated control signal so as to selectively allow current to flow in the primary winding when the switch is on. A PWM controller provides a drive output in the form of a pulse width modulated control signal to the switch control input terminal based at least in part on a PWM control input, and includes a comparator input coupled to receive a sense voltage from a first terminal of the sense resistor. An error amplifier is provided, including an error input and an output coupled to provide a signal to the PWM control input.

The estimator circuit includes a capacitance with a first terminal coupled with the PWM controller comparator input, as well as a second terminal coupled with the error input of the error amplifier. In addition, the estimator includes a second switching device coupled between the second capacitor terminal and circuit ground, as well as a control input coupled with the PWM controller drive output. The second switch selectively couples the second capacitor terminal with ground to allow the capacitance to charge based on the sense voltage when the first switching device lets current flow in the primary winding, and decouples the second terminal of the capacitance from the circuit ground to allow the capacitance to provide a signal to the error amplifier when the first switching device prevents primary current flow. In this manner, the error amplifier is provided with a signal representative of the output current flowing in the secondary winding of a flyback or other type converter, without sacrificing output efficiency and without requiring bulky and expensive sensing and isolation circuitry.

In certain embodiments, the second switching device of the estimator is an n-channel MOSFET with a source coupled with the second terminal of the capacitance, a drain coupled with the circuit ground, and a gate coupled with the drive output of the pulse width modulation controller. In other implementations, the estimator includes a p-channel MOSFET with a gate, a drain coupled with the second terminal of the capacitance, and a source coupled with the circuit ground, as well as inverter with an input coupled with the drive output of the pulse width modulation controller and an output coupled with the gate of the second switching device.

In certain embodiments, a transition mode PWM controller is used, having a zero crossing detect input, and the circuit includes a zero crossing detection circuit with one or more sense windings magnetically coupled with the primary winding. The zero crossing circuit senses a zero crossing condition of the primary winding and provides a signal to the zero crossing detect input of the PWM controller.

An application specific integrated circuit (ASIC) is provided for operating a pulse width modulated power converter circuit. The ASIC includes input terminals for a setpoint, a drive output, a comparator input, and a circuit ground, as well as a PWM controller, an error amplifier, and an estimator circuit. The PWM controller has a PWM control input, a comparator input coupled with the comparator input terminal, and a drive output providing a pulse width modulated control signal to the drive output terminal at least partially according to the PWM control input. The error amplifier includes an input coupled with the setpoint input terminal, and an output coupled to provide a signal to the PWM control input of the PWM controller. The estimator circuit includes a capacitance and a switch, where the capacitance is coupled between the comparator input and the error amplifier input, and the switch is connected between the capacitor and a circuit ground. The switch receives a control input from the PWM controller drive output and operates in a first mode to couple the capacitance to the circuit ground to allow the capacitance to charge based on the sensed voltage at the comparator input terminal, and in a second mode to decouple the second terminal of the capacitance from ground to allow the capacitance to provide a signal to the error amplifier. In certain embodiments, the PWM controller is a transition mode PWM controller. In certain embodiments, the ASIC switch is an n-channel MOSFET with a gate coupled with the PWM controller drive output. In other embodiments, the switch is a p-channel MOSFET, with an inverter coupling the PWM controller drive output with the MOSFET gate.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
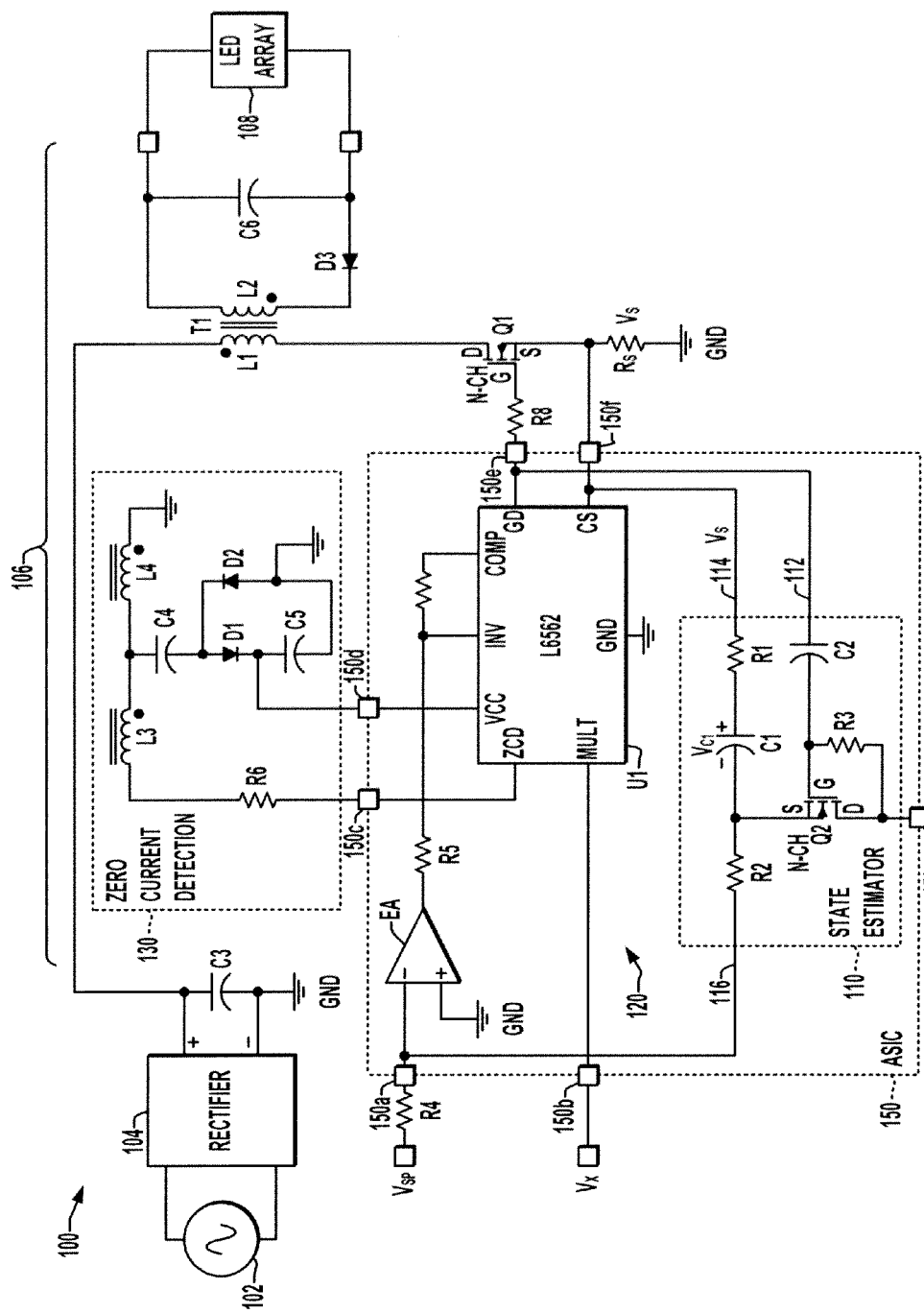
FIG. 1 is a schematic diagram illustrating an exemplary LED driver circuit with a flyback DC-DC converter using a primary-side state estimator circuit to estimate the secondary side output current in accordance with one or more aspects of the present disclosure.

Referring now to the drawings, like reference numerals are used to refer to like elements throughout and the various features are not necessarily drawn to scale. FIG. 1 illustrates an exemplary LED driver circuit 100 with a flyback DC-DC converter 106 to convert DC power from an input rectifier 104 to drive one or more LED light sources 108. The driver 100 receives AC power from a single or multi-phase input source 102, which is converted to a DC bus via the rectifier 104 with an output filter capacitor C3, where the DC is referenced to a circuit ground GND in one implementation, although not a strict requirement of the present disclosure. The DC-DC converter stage 106 in this embodiment is a flyback converter that converts the DC bus from the rectifier 104 to drive a transformer T1, and a secondary circuit converts current to DC output power to drive the LED load 108. The transformer T1 includes a primary winding L1 and a secondary winding L2 with the indicated dot polarities. The secondary circuit includes the winding L2 with a rectifying diode D3 in a lower output branch, along with an output capacitor C6 to smooth the rectified DC power provided to the LED array 108. The rectifier D3 in this case is positioned such that when current flows in the primary winding L1 (into the 'dot'), the corresponding secondary current (out of the 'dot') in the winding L2 is blocked, causing the flux to build up in the core of the transformer T1, and conversely, the secondary current will flow from the winding L2 to the capacitor C6 and the load 108 (and back into the 'dot' end of winding L2) once the primary current stops for flyback operation.

As seen in FIG. 1, the flow of current through the primary winding L1 is controlled by a first switching device Q1, in this case an n-channel MOSFET (although other converter switch types could be used). Q1 is connected in series between the primary winding L1 and the circuit ground GND along with a series-connected sense resistor $R_S$. As primary current flows through this series circuit, the current through $R_S$ provides a corresponding voltage $V_S$ (relative to the circuit ground GND) across the sense resistor $R_S$. This sensed voltage $V_S$ is used for both cycle-to-cycle control of the primary current and for charging a capacitance C1 of a state estimator circuit 110 as described in greater detail below. The first switching device Q1 in this example includes a drain D coupled with the primary winding L1, a source S coupled with the sense resistor $R_S$, and a gate control input terminal G. The switching operation of Q1 is performed via a control signal applied to the gate G from a PWM controller U1 so that the switch Q1 selectively electrically couples the drain and source in a first mode to allow current to flow in the primary winding L1, and otherwise prevents primary current from flowing in a second mode (high source/drain impedance, or "off" state of Q1).

The driver 100 also includes a pulse width modulation (PWM) circuit 120 and an estimator circuit 110, where the circuits 110 and 120 may be integrated into an application specific integrated circuit (ASIC) 150 in certain embodiments. In other implementations, the estimator circuit 110 may be a separate ASIC with terminals for receiving a gate drive signal 112, a sense voltage input 114 (VS) a ground terminal connection terminal (GND), and an output terminal for providing a feedback estimate signal 116.

The PWM circuit 120 includes a PWM controller U1 with a PWM control input INV and a comparator input CS coupled with an upper (first) terminal of the sense resistor RS to receive the sense voltage $V_S$. The controller U1 also includes a drive output GD providing a pulse width modulated control signal via resistor R8 to the gate of Q1 at least partially according to the PWM control input INV, where the gate drive signal 112 is also coupled to the estimator circuit 110. The PWM controller U1 in certain embodiments is a transition mode power factor correction (PFC) controller such as an L6562 integrated circuit available from Intersil and STMicroelectronics, providing a totem pole output stage for the PWM driver output GD. The device U1 includes an on-board error amplifier (not shown) with an inverting input INV and an output COMP used in the illustrated embodiments strictly to invert the output of the error amplifier EA. A compensation network (not shown) can be inserted between the inverting input of EA and its output terminal. As noted, the functions of the PWM controller U1, the error amplifier EA and the state estimator 110 can be implemented as an ASIC 150. Possible ASIC embodiments might not need the inversion provided by use of the INV input in the example of FIG. 1, and instead the inversion could be built into the ASIC transition mode logic. Normally a multiplier input MULT is provided to a multiplier in the device U1 to provide a sinusoidal inverting input to an internal pulse width modulation (PWM) comparator (not shown), with a non-inverting PWM comparator input being derived from an input CS. In the illustrated embodiments, however, the multiplier input MOLT is connected to a variable voltage in the circuit 100 or to a fixed reference voltage, indicated as $V_X$ in FIG. 1. The variable voltage may be used, for example, in applications which require dimming of the LED array.

The device U1 includes a PWM driver circuit providing the gate drive output GD based on the PWM comparator output, which is selectively enabled and disabled according to a zero-current detect input ZCD. The current flowing in the MOSFET Q1 is sensed through the resistor $R_S$, and the resulting voltage is applied to the CS pin and compared with an internal sinusoidal-shaped reference, generated by the multiplier, to determine the MOSFET's turn-off. In practice, the gate drive output GD is selectively disabled according to the ZCD input signal status for transition-mode operation, where a negative-going edge triggers the MOSFET's turn-on. This advantageously allows connection to an optional zero current detection circuit 130 such that the switch Q1 will turn on when the current through the primary winding L1 is zero. The ground pin GND provides a current return path for both the signal part and the gate driver circuitry of U1.

The PWM circuit 120 further includes an error amplifier EA, having inverting and non-inverting inputs and an output. In the illustrated example, the non-inverting (+) input is connected to circuit ground GND, although other embodiments are possible in which this input is connected to a non-zero reference voltage. The error amplifier EA has an inverting error input (−) coupled to the terminal 150a for connection in the circuit 100 to a setpoint source voltage $V_{SP}$, such as a dimmer control circuit (not shown) or this may be coupled to a fixed setpoint reference. The amplifier EA also includes an output coupled to provide a signal to the PWM control input INV. Dimming operation can be implemented in this embodiment by either adjusting the setpoint input $V_{SP}$ to the error amplifier EA, in which case feedback control is maintained. Alternatively, dimming may be done by adjusting the MULT input voltage $V_X$, where the error amplifier EA in this latter approach saturates to its lowest level to effectively open the control loop.

Figure 3:
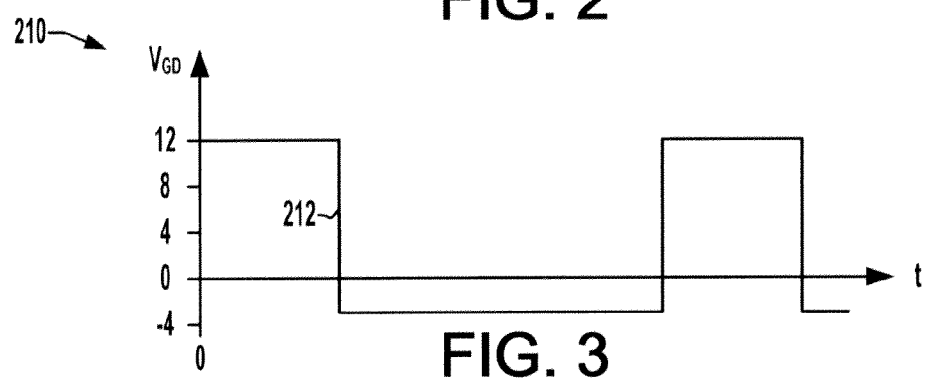
FIG. 3 is a graph illustrating a gate drive signal at the estimator circuit switch control terminal in the circuit of FIG. 1.
Figure 4:
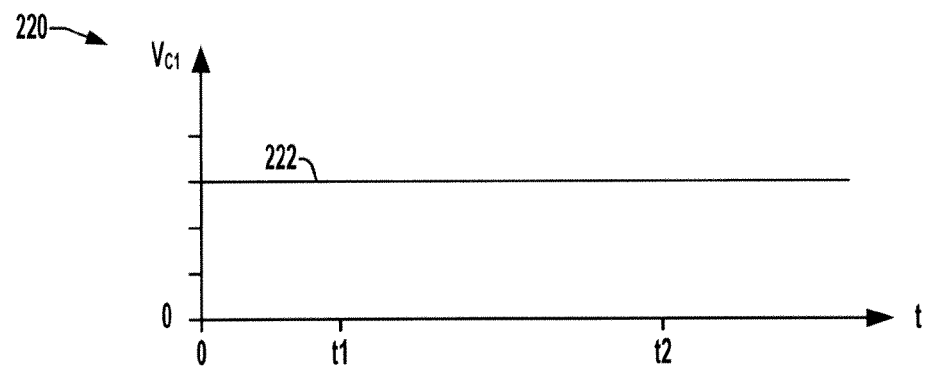
FIG. 4 is a graph illustrating the voltage across the estimator capacitance in the converter of FIG. 1.

A state estimator circuit 110 is provided, which is electrically isolated from the secondary winding L2 of the transformer T1, and which receives the gate drive signal 112 from the drive output GD along with the sense voltage input 114 ($V_S$). The estimator 110 provides a feedback signal output 116 representing the estimated secondary current flowing through L2. The sense voltage $V_S$ is provided as a signal 114 through a charging resistance R1 to a first terminal of a capacitance C1. The second terminal of C1 is coupled with the inverting error input (−) of the error amplifier EA through a second resistance R2. A second switching device Q2 is coupled between the second terminal of C1 and the circuit ground GND. In one embodiment shown in FIG. 1, the second switching device Q2 is an n-channel MOSFET with a source S coupled with the second terminal of the capacitance C1, a drain D coupled with the circuit ground GND, and a gate G capacitively coupled with the drive output GD of the pulse width modulation controller U1 through a capacitor C2, along with a resistor 83 coupled between the gate G and drain D. FIG. 3 below shows an alternate embodiment in which the second switch Q2 is a p-channel MOSFET with an inverter U2 driving the gate G.

Figure 2:
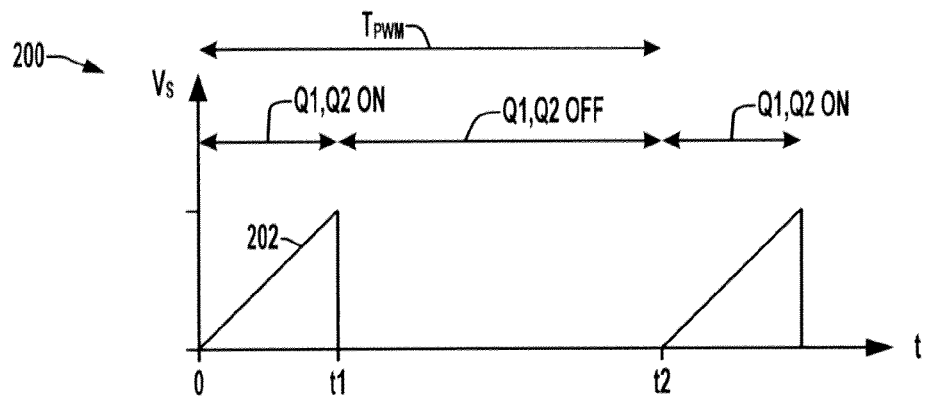
FIG. 2 is a graph illustrating the voltage across a sense resistor in the primary winding circuit of the flyback converter of FIG. 1.

Referring also to FIGS. 2-5, in operation, the second switch Q2 operates according to the drive output GD to selectively couple the second terminal of the capacitance C1 with the circuit ground GND to allow the capacitance C1 to charge based on the sense voltage $V_S$ when Q1 allows current to flow in the primary winding L1. FIG. 2 shows a graph 200 illustrating the voltage $V_S$ during exemplary cycles of the gate drive output GD, where the output is switched on for a first portion of a modulation cycle period $T_{PWM}$ and off for the remainder of the period. When active, Q1 is conductive or "on", allowing primary winding current to begin flowing as seen in the sense voltage ($V_S$) waveform 202 of FIG. 2. When the switch Q1 shuts "off" (at time t1 in FIG. 2), the primary current ceases until the next turn on switching (at time t2 in the figures). As shown in graph 210 of FIG. 3, since the drive output signal 112 is capacitively coupled to the second transistor gate of Q2, the gate-drain voltage $V_{GD}$ 212 of Q2 is a positive value (e.g., +12 volts in one example for a relatively long duty cycle as shown) when the drive output is active (while Q1 is "on"), thus causing the second switch Q2 to conduct, thereby grounding the second terminal of the capacitor C1. Graph 220 in FIG. 3 shows the voltage $V_{C1}$ 222 across the estimator capacitance C1, which is the average value of the sensed voltage $V_S$ over the time interval 0<t<t1.

When the drive output transitions to the second state (e.g., when Q1 is turned "off" at time t1), the gate-drain voltage 212 of Q2 goes slightly negative (e.g., about −3 volts in one implementation). In this second mode, Q2 is "off" (high source-drain impedance), and Q2 effectively disconnects the second terminal of C1 from ground GND. Since C1 is charged in the polarity direction shown in FIG. 1, C1 the capacitor voltage appears (inverted) across the resistor R2 and is applied as a signal to the error input (−) of the error amplifier EA while Q1 prevents current flow in the primary winding L1. The voltage across the resistor R2 is shown as waveform 232 ($V_{R2}$) in the graph 230 of FIG. 5, which is negative between time t1 and time t2. In certain embodiments, the values for the capacitor C1 and charging resistor R1 are set such that the corresponding RC time constant allows fairly quick charging of the capacitance C1 relative to the PWM period $T_{PWM}$.

Figure 5:
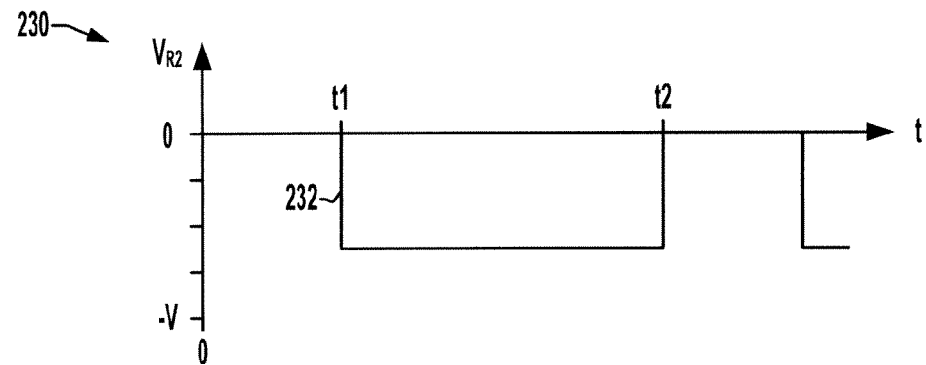
FIG. 5 is a graph illustrating an estimated secondary current signal provided to the error amplifier by the estimator circuit in the converter of FIG. 1.

As seen in FIGS. 1 and 5, the waveform 232 provides a feedback signal to the error amplifier inverting (−) input, which is summed with the setpoint input $V_{SP}$, such that the error amplifier output provides a corresponding error signal for closed loop operation of the PWM circuit to regulate the secondary-side output current. In this regard, the feedback signal 116 provided from the estimator circuit 110 to the error amplifier EA is proportional to the flyback current flowing in the secondary winding L2. Thus, the signal 116 is a representative estimate, while the estimator circuit 110 is electrically isolated from the secondary (e.g., no direct sensing, no sense transformers, no optical couplers, etc.). Moreover, no direct sensing resistance is needed in the secondary circuit itself, whereby the secondary current estimation allows closed loop output regulation without adversely impacting the output efficiency of the driver circuit 100.

As shown in FIG. 1, moreover, the circuit 100 in certain embodiments may also include a zero crossing detection circuit 130 coupled with the transition mode PWM controller U1. The zero crossing detection circuit 130 includes sense windings L3 and L4 which are wound on the core of transformer T1 and are thus magnetically coupled with the primary winding L1, and the circuit further includes a center node connecting L3 and L4 with capacitor C4. The lower terminal of C4 is coupled to VCC through diode D1 and to ground through diode D2, and a bypass capacitor C5 is connected from VCC to ground GND. The zero crossing circuit 130 senses a zero crossing condition of the primary winding L1 using the sense windings L3 and L4 and selectively provides a signal via resistor R6 to the zero crossing detect input ZCD of the PWM controller U1 indicating a sensed zero crossing condition of the primary winding L1.

Figure 6:
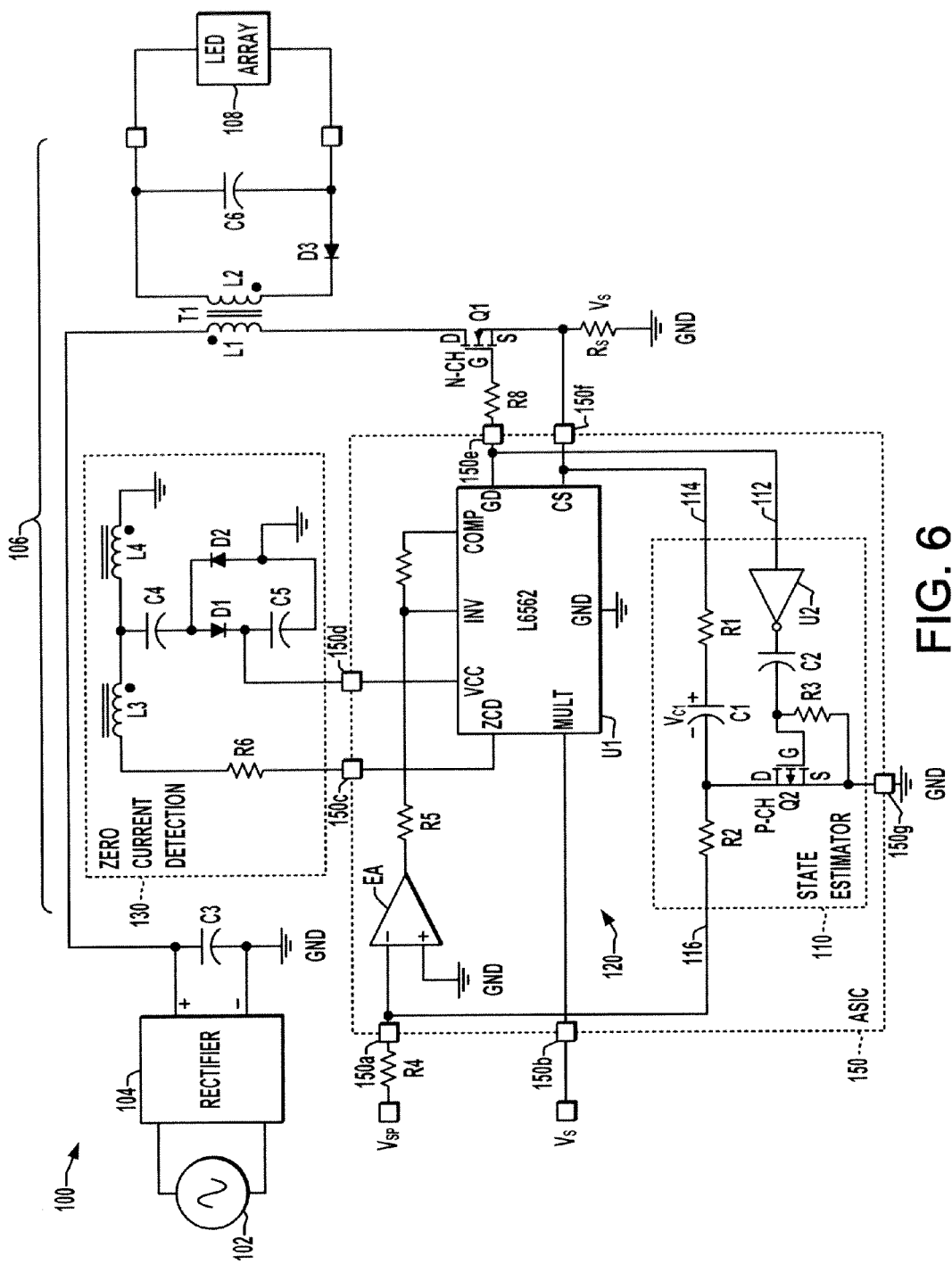
FIG. 6 is a schematic diagram illustrating another driver circuit embodiment with an estimator circuit using a p-channel MOSFET switch and an inverter in accordance with the disclosure.

FIG. 6 is a schematic diagram illustrating another driver circuit embodiment with an estimator circuit 110 using a p-channel MOSFET switch Q2 and an inverter in accordance with the disclosure. In this embodiment, the second switching device Q2 has a gate G, a drain D coupled with the second terminal of the capacitance C1, and a source S coupled to ground GND, and the estimator circuit 110 includes an inverter U2 with an input coupled to receive the drive output GD from the PWM controller U1 and an output coupled with the gate G of the second switching device Q2. In other respects, this embodiment provides the estimation functionality as described above in connection with FIGS. 1-5.

As shown in the examples of FIGS. 1 and 3, the pulse width modulation circuit 120 and the estimator circuit 110 may be implemented as an application specific integrated circuit (ASIC) 150. The ASIC 150 can be used in the illustrated driver 100 or in other applications for operating a pulse width modulated power converter circuit 100. The ASIC 150 includes externally accessible electrical terminals including a setpoint terminal 150a, a multiplier input terminal 150b, a ZCD signal input terminal 150c, a power (VCC) terminal 150d, as well as a drive output terminal 150e, a comparator input terminal 150f, and a circuit ground terminal 150g. The device 150 includes a PWM controller U1 with a PWM control input INV, a comparator input CS coupled with the comparator input terminal 150f, and a drive output GD providing a pulse width modulated control signal to the drive output terminal 150e at least partially according to the PWM control input INV. In addition, the ASIC 150 has an error amplifier EA including an error input (−) coupled with the setpoint input terminal 150a, and an output coupled to provide a signal to the PWM control input INV of the pulse width modulation controller U1. ASIC 150 also includes an estimator circuit 110, with a capacitance C1 and a switch Q2, where the capacitance C1 has a first terminal coupled with the comparator input CS and a second terminal coupled with the error input (−). The switch Q2 is connected between the second capacitor terminal and ground and operates as described above according to the drive output GD to selectively allow the capacitor C1 to charge in a first mode (with C1 grounded) and to then provide a feedback estimate signal 116 to the error amplifier EA when Q2 is off.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. Although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. A circuit for powering at least one light source, comprising:
  a transformer, comprising a primary winding, and a secondary winding coupled to provide electrical power to a light source;
  a sense resistor with a first terminal coupled with the primary winding and a second terminal coupled with a circuit ground;
  a first switching device comprising a first power terminal coupled with the primary winding, a second power terminal coupled with the sense resistor, and a first control input terminal, the first switching device being operative according to a control signal at the first control input terminal to selectively electrically couple the first and second power terminals to allow current to flow in the primary winding;
  a pulse width modulation circuit comprising:
    a pulse width modulation controller, including a PWM control input, a comparator input coupled with the first terminal of the sense resistor to receive a sense voltage, and a drive output providing a pulse width modulated control signal to the first control input terminal of the switching device at least partially according to the PWM control input, and
    an error amplifier, including an error input, and an output coupled to provide a signal to the PWM control input of the pulse width modulation controller; and
  an estimator circuit electrically isolated from the secondary winding of the transformer, the estimator circuit comprising:
    a capacitance with a first terminal coupled with the comparator input of the pulse width modulation controller, and a second terminal coupled with the error input of the error amplifier, and
    a second switching device, comprising a first power terminal coupled with the second terminal of the capacitance, a second power terminal coupled with the circuit ground, and a second control input terminal coupled with the drive output of the pulse width modulation controller, the second switching device operative according to the drive output of the pulse width modulation controller to selectively couple the second terminal of the capacitance with the circuit ground to allow the capacitance to charge based on the sense voltage when the first switching device allows current to flow in the primary winding, and to decouple the second terminal of the capacitance from the circuit ground to allow the capacitance to provide a signal to the error input of the error amplifier when the first switching device prevents current flow in the primary winding.

2. The circuit of claim 1, where the PWM controller is a transition mode PWM controller.

3. The circuit of claim 2, where the second switching device is an n-channel MOSFET with a source coupled with the second terminal of the capacitance, a drain coupled with the circuit ground, and a gate coupled with the drive output of the pulse width modulation controller.

4. The circuit of claim 3, where the transition mode PWM controller includes a zero crossing detect input, the circuit further comprising a zero crossing detection circuit coupled with the transition mode PWM controller, the zero crossing detection circuit including at least one sense winding magnetically coupled with the primary winding, the zero crossing circuit operative to sense a zero crossing condition of the primary winding using the at least one sense winding and to selectively provide a signal to the zero crossing detect input indicating a sensed zero crossing condition of the primary winding.

5. The circuit of claim 3, comprising an application specific integrated circuit including the pulse width modulation circuit and the estimator circuit.

6. The circuit of claim 5, where the transition mode PWM controller includes a zero crossing detect input, the circuit further comprising a zero crossing detection circuit coupled with the transition mode PWM controller, the zero crossing detection circuit including at least one sense winding magnetically coupled with the primary winding, the zero crossing circuit operative to sense a zero crossing condition of the primary winding using the at least one sense winding and to selectively provide a signal to the zero crossing detect input indicating a sensed zero crossing condition of the primary winding.

7. The circuit of claim 2, comprising an application specific integrated circuit including the pulse width modulation circuit and the estimator circuit.

8. The circuit of claim 2, where the second switching device is a p-channel MOSFET with a gate, a drain coupled with the second terminal of the capacitance, and a source coupled with the circuit ground, the estimator circuit comprising an inverter with an input coupled with the drive output of the pulse width modulation controller and an output coupled with the gate of the second switching device.

9. The circuit of claim 8, where the transition mode PWM controller includes a zero crossing detect input, the circuit further comprising a zero crossing detection circuit coupled with the transition mode PWM controller, the zero crossing detection circuit including at least one sense winding magnetically coupled with the primary winding, the zero crossing circuit operative to sense a zero crossing condition of the primary winding using the at least one sense winding and to selectively provide a signal to the zero crossing detect input indicating a sensed zero crossing condition of the primary winding.

10. The circuit of claim 8, comprising an application specific integrated circuit including the pulse width modulation circuit and the estimator circuit.

11. The circuit of claim 1, where the second switching device is an n-channel MOSFET with a source coupled with the second terminal of the capacitance, a drain coupled with the circuit ground, and a gate coupled with the drive output of the pulse width modulation controller.

12. The circuit of claim 11, comprising an application specific integrated circuit including the pulse width modulation circuit and the estimator circuit.

13. The circuit of claim 1, where the second switching device is a p-channel MOSFET with a gate, a drain coupled with the second terminal of the capacitance, and a source coupled with the circuit ground, the estimator circuit comprising an inverter with an input coupled with the drive output of the pulse width modulation controller and an output coupled with the gate of the second switching device.

14. The circuit of claim 13, comprising an application specific integrated circuit including the pulse width modulation circuit and the estimator circuit.

15. The circuit of claim 1, comprising an application specific integrated circuit including the pulse width modulation circuit and the estimator circuit.

16. An application specific integrated circuit for operating a pulse width modulated power converter circuit, the application specific integrated circuit comprising:
a setpoint input terminal;
a drive output terminal;
a comparator input terminal;
a circuit ground terminal;
a pulse width modulation controller, including a PWM control input, a comparator input coupled with the comparator input terminal, and a drive output providing a pulse width modulated control signal to the drive output terminal at least partially according to the PWM control input;
an error amplifier, including an error input coupled with the setpoint input terminal, and an output coupled to provide a signal to the PWM control input of the pulse width modulation controller; and
an estimator circuit, comprising:
a capacitance with a first terminal coupled with the comparator input of the pulse width modulation controller and a second terminal coupled with the error input of the error amplifier, and
a switching device, comprising a first power terminal coupled with the second terminal of the capacitance, a second power terminal coupled with the circuit ground terminal, and a control input terminal coupled with the drive output of the pulse width modulation controller, the switching device operative according to the drive output of the pulse width modulation controller to selectively couple the second terminal of the capacitance with the circuit ground terminal to allow the capacitance to charge based on a sense voltage at the comparator input terminal and to decouple the second terminal of the capacitance from the circuit ground terminal to allow the capacitance to provide a signal to the error input of the error amplifier.

17. The application specific integrated circuit of claim 16, where the PWM controller is a transition mode PWM controller.

18. The application specific integrated circuit of claim 16, where the switching device is an n-channel MOSFET with a source coupled with the second terminal of the capacitance, a drain coupled with the circuit ground terminal, and a gate coupled with the drive output of the pulse width modulation controller.

19. The application specific integrated circuit of claim 16, where the switching device is a p-channel MOSFET with a gate, a drain coupled with the second terminal of the capacitance, and a source coupled with the circuit ground terminal, the estimator circuit comprising an inverter with an input coupled with the drive output of the pulse width modulation controller and an output coupled with the gate of the switching device.

* * * * *